United States Patent
Vanniasinkam et al.

(10) Patent No.: US 7,349,597 B2
(45) Date of Patent: Mar. 25, 2008

(54) GRATING BASED MULTIPLEXER/DEMULTIPLEXER COMPONENT

(75) Inventors: Joseph Vanniasinkam, Scarborough (CA); Jon Meyer, Fremont, CA (US); Christopher Viray, Sunnyvale, CA (US); Bor-Long Twu, Sunnyvale, CA (US)

(73) Assignee: Opnext, Inc., Eatontown, NJ (US)

( * ) Notice: Subject to any disclaimer, the term of this patent is extended or adjusted under 35 U.S.C. 154(b) by 300 days.

(21) Appl. No.: 10/028,419

(22) Filed: Dec. 21, 2001

(65) Prior Publication Data

US 2004/0213519 A1 Oct. 28, 2004

(51) Int. Cl.
*G02B 6/134* (2006.01)
*G02B 6/12* (2006.01)
*G02F 1/295* (2006.01)

(52) U.S. Cl. .............................. 385/37; 385/10; 385/14
(58) Field of Classification Search ................... 385/37, 385/10, 14, 18, 31, 39, 52
See application file for complete search history.

(56) References Cited

U.S. PATENT DOCUMENTS

| | | | | |
|---|---|---|---|---|
| 5,835,458 A * | 11/1998 | Bischel et al. | ........... | 369/44.12 |
| 6,081,331 A | 6/2000 | Teichmann | | |
| 6,108,471 A * | 8/2000 | Zhang et al. | .................. | 385/37 |
| 6,134,359 A | 10/2000 | Keyworth et al. | ............. | 385/33 |
| 6,141,361 A | 10/2000 | Mears et al. | .................. | 372/20 |
| 6,236,780 B1 * | 5/2001 | Wade | ........................... | 385/37 |
| 6,275,630 B1 * | 8/2001 | Yang et al. | .................... | 385/37 |
| 6,563,977 B1 * | 5/2003 | Chen et al. | .................... | 385/24 |
| 6,892,002 B2 | 5/2005 | Christoffersen et al. | | |
| 6,978,062 B2 | 12/2005 | Rose et al. | | |
| 7,085,492 B2 | 8/2006 | Ibsen et al. | | |
| 2002/0154855 A1 * | 10/2002 | Rose et al. | .................... | 385/24 |
| 2003/0067645 A1 * | 4/2003 | Ibsen et al. | .................. | 359/124 |
| 2006/0244161 A1 | 11/2006 | Vanniasinkam et al. | | |

OTHER PUBLICATIONS

Response to Notice of Non-Compliant Amendment dated Oct. 2, 2006, in U.S. Appl. No. 11/455,114.
Office Action dated Dec. 27, 2006, in U.S. Appl. No. 11/455,114.
Final Office Action mailed Jun. 21, 2007 in U.S. Appl. No. 11/455,114.
Response to Office Action mailed Dec. 27, 2006, for U.S. Appl. No. 11/455,114, filed Mar. 27, 2007.

* cited by examiner

*Primary Examiner*—K. Cyrus Kianni
(74) *Attorney, Agent, or Firm*—Finnegan, Henderson, Farabow, Garrett & Dunner, L.L.P.

(57) ABSTRACT

A grating based demultiplexer module is described. The module includes an integrally formed first section, second section, and third section. The first section includes a diffraction grating formed on the surface of the first section and directs a WDM beam onto the internal surface of the diffraction grating. The third section is positioned to receive angularly separated light from the external surface of the diffraction grating. In some embodiments, the third section can direct individualy beams of the angularly separated light onto the surface of optical detectors. The third section provides structural support and maintains the alignment between the first section and the third section.

16 Claims, 5 Drawing Sheets

GRATING BASED MULTIPLEXER/DEMULTIPLEXER COMPONENT

BACKGROUND

1. Field of the Invention

The present invention relates to a multiplexer or demultiplexer optical component and, in particular, to a multiplexer or demultiplexer for a wavelength division multiplexed optical system.

2. Discussion of Related Art

Wavelength division multiplexing has become a standard in optical networks over the last few decades. Wavelength division multiplexing (WDM) exploits the potential bandwidth of optical fibers by transmitting data over several channels on the same fiber. Each channel is transmitted on the optical fiber at a different wavelength. The rate of data transmission over the fiber, then, can be increased by a factor of M, where M is the number of channels (i.e., the number of different wavelengths) being transmitted over the fiber.

Recently, an explosion of WDM technologies has appeared on the market. Systems having 8, 16, and 32 channels have become commonplace. Dense WDM, DWDM, for example, can have 32 channels following an ITU grid with 0.8 nm wavelength separation. However, in order to effectively utilize the bandwidth of the optical fiber, optical signals must be multiplexed and demultiplexed onto the fiber.

In WDM systems, optical signals are transmitted over a set of M channels. The M channels are multiplexed at the transmitter so that M wavelengths of light are simultaneously transmitted on an optical fiber to a receiver system. At the receiver system, the M channels are demultiplexed into optical signals transmitted at individual wavelengths of light. The individual wavelengths of light can then be directed to photodetectors so that the optical signals can be converted into electrical signals for processing by subsequent electronic circuitry.

In some demultiplexing systems, an optical fiber can be directly attached to a dielectric waveguide. The waveguide geometry exploits interference and/or diffraction in order to separate different wavelength constituents of the input light beam. These systems are difficult to fabricate, have large insertion losses, and are only applicable to single-mode fibers.

Demultiplexing can be accomplished with diffraction gratings, prisms, or filters, for example. The major problem with such devices is that they often include bulky and costly lenses and such which are very hard to reliably align, leading to large manufacturing costs and a bulky final product. Conventionally, most WDM or DWDM demultiplexer systems include filter-based demultiplexers, primarily do to the fact that formation of gratings in glass are more expensive to fabricate than are filters.

In the past few years, with the advent of high data rate communications, the concept of wide WDM (WWDM) (channel spacings of ~25 nm) has been proposed and is currently being actively considered as a standard for 10 Gigabit Ethernet and Fiber Channel communication systems. Currently, demultiplexer systems being proposed for use in WWDM systems have involved filter based demultiplexer systems. However, filter based demultiplexer systems are expensive, primarily because of the assembly costs due to the small filters and multiple other components which require time consuming alignment and assembly. Furthermore, the design of a filter based demultiplexer system is not scalable to systems having more channels. Also, the design of the filter based systems cannot be scaled down to small physical beam separation distances due to limitation on the size of filters and beam clipping. Finally, filter based demultiplexer systems require complicated alignment of several subassemblies.

Therefore, there is a need for a less expensive and more versatile demultiplexer system for utilization in WWDM, WDM or DWDM systems.

SUMMARY

In accordance with the present invention, a demultiplexer with a diffraction grating for separating the separate wavelengths of light is presented. A demultiplexer according to the present invention includes a grating, which spatially separates the separate wavelengths of light representing individual channels on a wavelength grid, integrally formed on a demultiplexer module. The wavelength grid can be any grid, including those grids commonly utilized in WDM, DWDM, or WWDM optical systems.

A demultiplexer module according to the present invention includes a first section, a second section integrally formed with the first section, and a third section integrally formed with the first and second sections. The first section receives a WDM beam and directs the WDM beam onto an internal surface of a diffraction grating integrally formed on a surface of the first section. The diffraction grating, then, has an internal surface internal to the first section and an external surface external to the first section. The diffraction grating angularly separates beams of individual wavelengths from the WDM beam and provides those beams at the external surface of the diffraction grating. The third section is positioned to receive the angularly separated beams. The second section provides structural support for the demultiplexer module and also relatively positions the third section with respect to the first section.

In some embodiments, the first section can also include an internal reflective surface for directing the WDM beam onto the internal surface of the diffraction grating. The internal reflective surface, which is internal to the first section, can rely on total internal reflection or, in some embodiments, can be coated on an external surface of the first section opposite the internal reflective surface of the first section to enhance the internal reflection. The coating, for example, can be thin films provided to enhance reflection or can be a thin film of gold or silver backing.

In some embodiments, the first section can further include a collimating lens to receive the WDM beam from an optical fiber. Further, the third section can further include a focusing lens to couple the angularly separated beams onto a detector array or into individually optical fibers.

A demultiplexer module according to the present invention can be formed, in some embodiments, from an optical plastic, in a single piece, removing any requirements for alignment of separate components of the first, second and third sections. Therefore, demultiplexers according to embodiments of the present invention can be inexpensively mass produced.

In some embodiments, the demultiplexer module includes an integrally formed barrel. The barrel is positioned relative to the first section in order that the first section receives a WDM beam from an optical fiber positioned and held by the barrel. A barrel includes a fiber access and fiber stop. An optical fiber positioned in the fiber access at the fiber stop is, then, aligned with the first section of the demultiplexer module. In operation, an optical fiber that can carry the WDM optical signal is positioned into the barrel and the light from the optical fiber is collimated by the collimating lens. In some embodiments, the barrel can be formed separately and attached to a post that is integrally formed with the demultiplexing module.

In some embodiments, the collimated light beam is incident on the diffraction grating substantially normal to the internal surface of the diffraction grating. The focusing lens of the third section, then, is positioned with respect to the external surface of the diffraction grating, from which the angularly separated individual beams are emitted, so as to capture a first or higher order diffraction peak from the diffraction grating. The focusing lens then focuses the individually separated beams of light from the diffraction grating onto an array of optical detectors. Each of the optical detectors, then, detects light of a particular wavelength. In some embodiments, light from individually separated beams are coupled into optical fibers, which then transmit light of separate data transmission channels corresponding to the separate wavelengths of the individual beams. In some embodiments, where the module is utilized in a multiplexer, optical detectors may be replaced with optical sources that emit light of appropriate wavelengths.

In some embodiments, the diffraction grating is a one-dimensional ruled grating. Some embodiments include a two-dimensional ruled grating. In some embodiments, the diffraction grating is formed so as to couple substantially all of the incident light into the first order diffraction peak so as to reduce the amount of incident radiation lost to other orders of diffraction peaks (e.g., the zeroth order).

In some embodiments, a multiplexer system can be formed with the demultiplexer mounting by coupling light of different wavelengths onto the transmission grating at the appropriate angle to couple that light into an optical fiber. In these embodiments, the optical detectors of the demultiplexer can be replaced by optical sources of the appropriate wavelengths to form a multiplexer. These optical sources can be optical fibers carrying individual channels of optical data at the appropriate optical wavelengths.

These and other embodiments are further described below along with the following Figures.

DETAILED DESCRIPTION

Figure 1A:
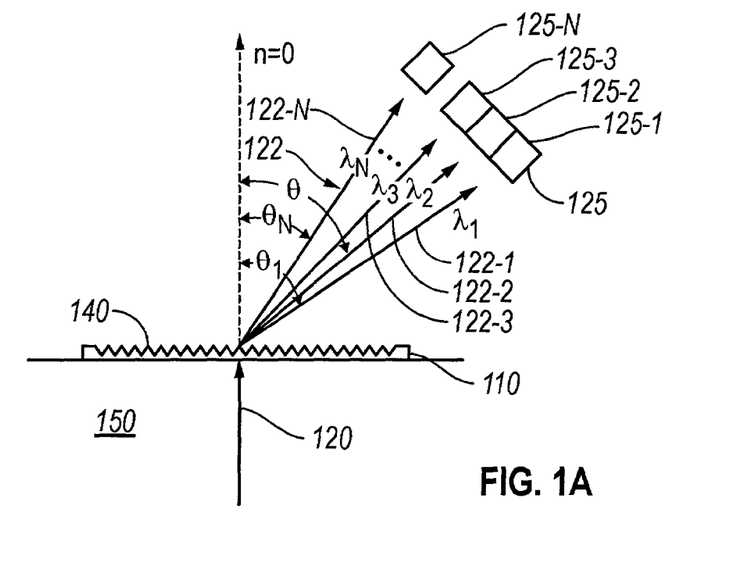
FIGS. 1A, 1B and 1C show an optical diagram of a demultiplexer according to the present invention.

FIG. 1A shows an optical ray diagram of a demultiplexer system 100 according to the present invention. Demultiplexer system 100 includes a transmission diffraction grating 110. Diffraction grating 110 is formed on the surface of a plastic part 150 and, therefore, has an internal surface and an external surface. Diffraction grating 110 can be positioned so that light beam 120 is incident substantially normal to the internal surface of grating 110. Transmission grating 110 includes ruled lines 140 which can be blazed in order to preferentially couple light into selected orders of diffraction peaks. Angularly separated beams 122 (including individual beams 122-1 through 122-N) are emitted from the external surface of diffraction grating 110.

Figure 1B:
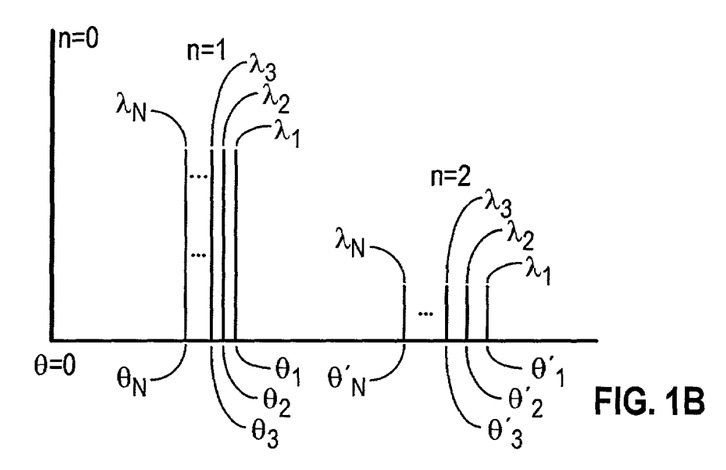
Figure 1C:
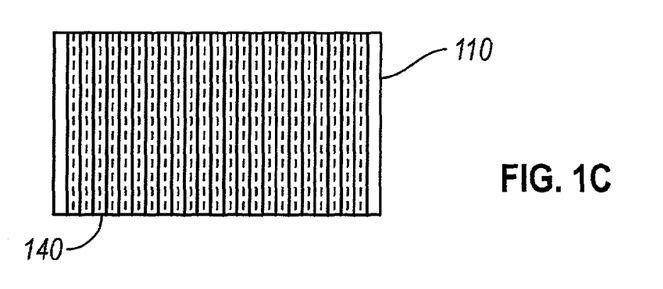

FIG. 1C shows the external surface (opposite the internal surface on which light beam 120 is incident) of diffraction grating 110. The external surface of diffraction grating 110 as shown in FIG. 1C can have parallel formed ruled lines 140 which are formed in plastic part 150. Ruled lines 140 can be blazed in order to preferentially couple light into selected orders of diffraction peaks, for example into the first order diffraction peak. Rulings 140 can be formed on the surface of plastic part 150 by forming trenches in the surface of plastic part 150 with appropriately shaped side walls. Although the particular example of transmission grating 110 of FIG. 1C has a one-dimensional ruled grating, other transmission gratings, for example a two-dimensionally ruled grating, can also be utilized.

The diffraction pattern resulting from grating 110 includes zero-th order (n=0), first order (n=1) and higher order diffraction peaks. As shown in FIG. 1B, all but the zero-th order pattern separates incoming beam 120 into individually separate beams 122-1 through 122-N based on the individual wavelengths of light in WDM beam 120. Beam 120, then, is demultiplexed into its separate wavelengths, for example, within the first-order (n=1) diffraction peak 122. In some embodiments, diffraction grating 110 can be blazed to preferentially couple light from WDM beam 120 into the first order diffraction peak of grating 110.

As shown in FIG. 1B, beam 120 can be separated with a larger angular separation in higher order peaks, however, the intensity of light coupled into those diffraction peaks is usually much less than the intensity coupled into the zero-th order peak and the first-order peak. In some embodiments, grating 110 has rulings 140 blazed appropriately to couple substantially all of beam 120 into the first order diffraction peak (e.g., about 95%).

In one example, diffraction grating 110 can have 2000 lines/mm over 1.5 mm. Additionally, beam 120 can include optical channels at wavelengths of 1275 nm, 1300 nm, 1325 nm, and 1350 nm. In some embodiments, molded surface relief gratings are capable of achieving about 1 µm trench depths and greater than about 1 µm grating pitch. In accordance with some embodiments of the present invention, a trench depth of about 0.5 µm and a pitch of about 5 µm can be used. In some embodiments, the grating can be an 8 level grating.

The first order diffraction beam 122, which includes individual beams 122-1 through 122-N, is, then, angled at an angle $\theta$ from a normal to the surface of transmission grating 110, where the angle $\theta$ represents the central angle of individual beams 122-1 through 122-N, $\theta_1$ through $\theta_N$, respectively. The angle $\theta$, then, can represents the average angular position of individual beams 122-1 through 122-N from the normal, $\theta_1$ through $\theta_N$, respectively. In some embodiments, the angle $\theta$ represents the average of the angular separation of the outside individual beams 122-1 and 122-N, $\theta_1$ and $\theta_N$ respectively.

Each of individual beams 122-1 through 122-N, separated by wavelengths, are distributed about the angle $\theta$ in a plane determined by the rulings of grating 110. With a linearly ruled diffraction grating such as the example of grating 110 shown in FIG. 1C, individual beams 122-1 through 122-N lie in a plane defined by the normal direction to the surface of grating 110 and a direction perpendicular to rulings 140 of grating 110 (denoted by angle $\phi=0$ in the plane of diffraction grating 110). If grating 110 is a two-dimensional grating (i.e., rulings 140 include rulings in two dimensions), then individual beams 122-1 through 122-N may be directed along a direction designated by radial angle φ in the plane of the surface of grating 110 and at an azimuthal angle θ from the normal to the surface of grating 110.

In some embodiments, diffraction beam 122 is at an angle θ of about 45° and φ being 0°. Furthermore, individual beams 122-1 through 122-N of each of the channels are angularly separated by about 2°. In an example with N=4 having wavelengths of $\lambda_1$=1275 nm, $\lambda_2$=1300 nm, $\lambda_3$=1325 nm, $\lambda_4$=1350 nm, and with transmission grating 110 having 2000 lines/mm, as described above, each of individual beams 122-1 through 122-4 can be angled at an angle of $\theta_1$ about 42°, $\theta_2$ about 44°, $\theta_3$ about 46°, and $\theta_4$ about 48°, respectively, from t to the surface of transmission grating 110. Over a transmission distance of about 12 mm, individual beams 122-1 through 122-4 can then be separated by about 250 μm.

With a linearly ruled grating, each of individual beams 122-1 through 122-N are directed in a direction perpendicular to the rulings 140 of transmission grating 110. The angular separation allows each of the separate beams in diffraction beam 122 to be incident on a corresponding one of detectors 125-1 through 125-N in a detector array 125. Therefore, the detectors in detector array 125 provide electrical signals in response to optical signals at each of the individual wavelengths of the individual beams in diffraction beam 122. In embodiments as discussed above with 250 μm separations over the transmission length (i.e., the distance between the top surface of diffraction grating 110 and the collection surface of detector array 125) of demultiplexer 100, then, the pitch of detectors 125-1 through 125-4 is about 250 μm. Although detector array 125 having the appropriate pitch is relatively inexpensive in increased cost over less compact systems, the greatly increased expense of forming optical filters of appropriate sizes to provide a pitch of 250 μm is not required.

Figure 2:
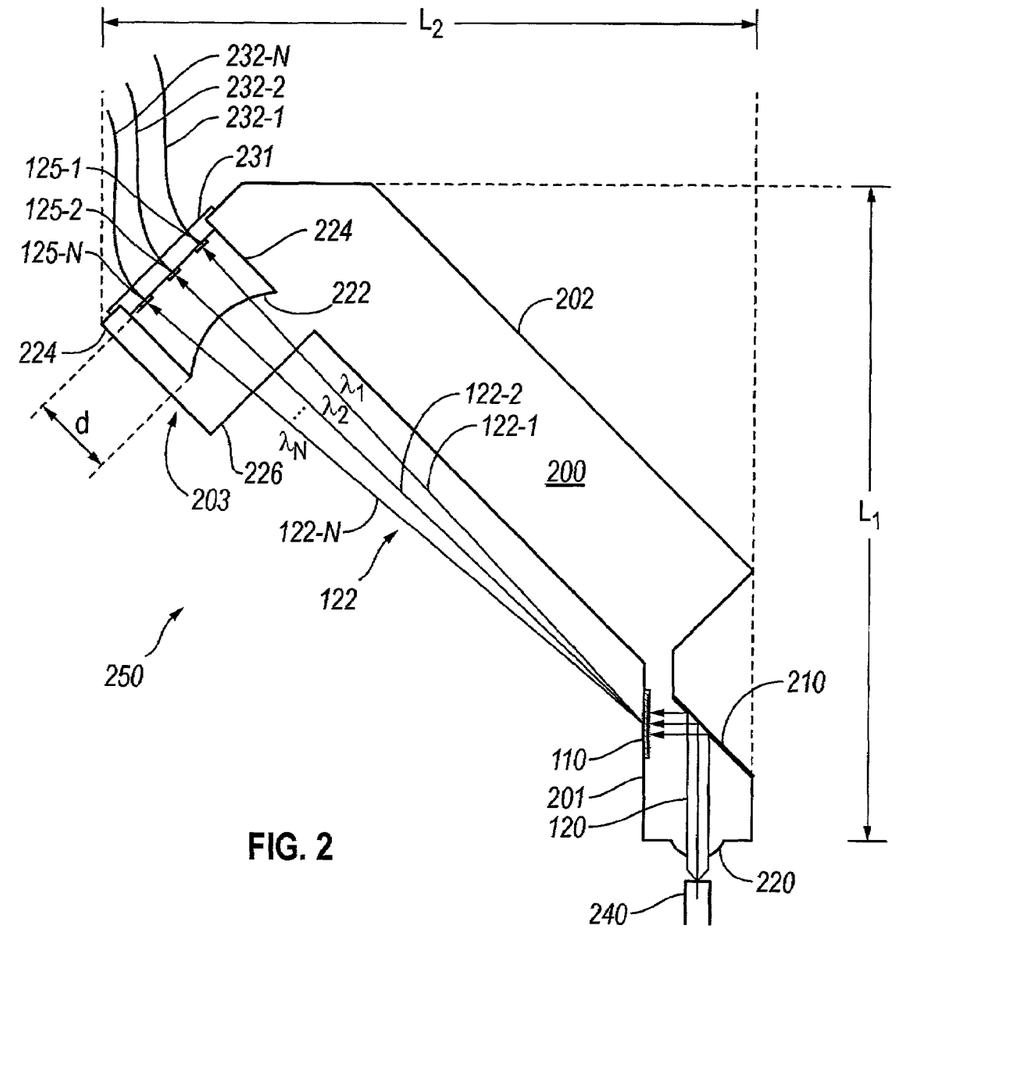
FIG. 2 shows a cross-section drawing of a demultiplexer according to the present invention.

FIG. 2 shows a cross-sectional drawing of a demultiplexer 250 according to the present invention. Demultiplexer 250 includes a demultiplexer module 200. Demultiplexer module 200 can be described as including individual sections 201, 202 and 203. Sections 201, 202 and 203 are integrally formed as a single piece to form demultiplexer module 200. Section 201 receives WDM beam 120 and directs beam 120 onto the internal surface of diffraction grating 110. Diffraction grating 110, then, is formed on an external surface of section 201. Section 203 receives individual beams 122-1 through 122-N and directs individual beams 122-1 through 122-N onto the surface of detector array 125, couples them into individual optical fibers, or receives light from optical sources (if module 200 is included in a multiplexer system). Section 202 provides structural support and spatially aligns sections 201 and 203. Sections 201, 202, and 203 are integrally formed by, for example, injection molding with an optically transparent material. Examples of optically transparent materials that can be utilized in forming demultiplexer 200 include Ultem® or Lexan®, both produced by General Electric Corporation.

In some embodiments, section 201 of demultiplexer 200 can include collimating lens 220 and reflection surface 210 along with transmission grating 110. Collimating lens 220 can be positioned relative to an optical fiber 240, which can carry WDM multiplexed beam 120, so as to collimate the light beam emitted from optical fiber 240. In some embodiments, lens 220 can be an aspheric lens that collimates light from a 0.3 NA fiber output.

Collimated light beam 120 can be reflected from reflector 210 and directed onto the back surface of diffraction grating 110. Reflector 210 can be formed as a total internal reflector or can include a reflective backing such as, for example, a gold or silver film. Further, reflection 210, as a total internal reflector, can by coated on the surface opposite the surface on which beam 120 is incident (i.e., the surface exposed external to diffraction mounting 200), with thin films in order to enhance reflection of beam 120.

Diffraction grating 110 can be formed in the surface of section 201 during the injection molding process. In some embodiments, diffraction grating 110 can be a one-dimensional ruled grating having evenly spaced trenches formed on the external surface of section 201 of demultiplexer module 200. In other embodiments, diffraction grating 110 can be a two-dimensional ruled grating, as discussed above. In some embodiments, diffraction grating 110 can be formed after injection molding other portions of demultiplexer module 200 by, for example, a number of etching processes. In the case where grating 110 is fabricated as a separate piece, grating 110 can be injection molded in a temperature-controlled environment and in a mold containing the relief microstructure to be replicated, referred to as the master. The master can be fabricated using lithographic fabrication of multiple levels of structures by using multiple steps of photoresist application, lithography and etching.

Lens and detector section 203 can include integrally formed focusing lens 222. Lens and detector section 203 may also include support 224 formed surrounding lens 222. Support 224, within which lens 222 can be formed, is integrally formed with support section 202. A detector array 232 (which includes detectors 232-1 through 232-N) mounted on array holder 231 can be positioned on support 224 and aligned such that individually separated beams of light 122-1 through 122-N are incident upon detectors 125-1 through 125-N, respectively. Each of detectors 125-1 through 125-N can provide electrical signals on electrical connections 232-1 through 232-N, respectively. Alternatively, each of detectors 125-1 through 125-N may be optical fibers so that light from each of individual beams 122-1 through 122-N is coupled into corresponding optical fibers.

Optical detectors 125-1 through 125-N of detector array 125 can be any optical detector device, including GaAs, Si, or InGaAs based photodetectors in either discrete or array form, optical fibers coupled to receive light corresponding to individual channels, or optical sources if demultiplexer 200 is utilized as a multiplexer instead of a demultiplexer. Optical sources can include photodiodes, vertical cavity surface-emitting lasers (VCSELS), or light carrying optical fiber.

Support 202 connects section 201 with 203 and is integrally formed with section 201 and 203. Support 202 is shaped so that section 203 is aligned with individual beams 122-1 through 122-N. In some embodiments, support 201 is a rectangular member with long axis angled at angle θ relative to a normal to the surface of grating 110.

In operation, light beam 120 from optical fiber 240 is collimated by lens 220 and directed onto transmission grating 110 by reflective surface 210. In some embodiments, light beam 120 is incident normally on an internal surface (i.e., internally to section 201) of transmission grating 110. Separated beam 122, including individual beams 122-1 through 122-N, is emitted from the opposite surface (i.e., the external surface) of transmission grating 110 at an angle θ from the normal to the opposite surface of transmission grating 110, as discussed above. Individual beams 122-1 through 122-N propagate outside of demultiplexer mounting 200 and reenters demultiplexer mounting 200 substantially normally at surface 226 of lens and detector portion 203. Surface 226, in some embodiments, can be coated with an anti-reflective film to increase the efficiency of demultiplexer 250. Lens 222 formed opposite surface 226 in lens and detector portion 203 focuses individual beams 122-1 through 122-N onto detectors 125-1 through 125-N, respectively, of detector array 125.

Demultiplexer module 200 can be formed as a single unit by an injection molding process, eliminating the steps of aligning through the optical system. The remaining alignment problem is reduced to insuring that fiber 240 is appropriately aligned with lens 220 and detector array 124 is appropriately aligned with lens 222. In some embodiments, a barrel support can be integrally formed with demultiplexer module 200 in order to align fiber 240. Further, alignment of support 231, where detector array 125 is mounted, can be accomplished through providing appropriate guide grooves in support 224 of demultiplexer module 200.

Further, demultiplexer module 200 provides a compact package. In some embodiments, demultiplexer module 200 can have a length $L_1$ of about 12 mm and a width $L_2$ of about 12.5 mm. Further, demultiplexer module 200 can have a cylindrical or rectangular cross section with width (or diameter) of about 3 mm. In some embodiments, where the WDM grid includes wavelengths of 1275 nm, 1300 nm, 1325 nm, and 1350 nm, then lens 220 can be an aspherical lens with characteristics such as a radius of curvature equal to 500 µm and a conic constant equal to −2.5 and lens 222 can have characteristics such as a radius of curvature equal to 300 µm and a conic constant equal to −2.5.

Figure 3A:
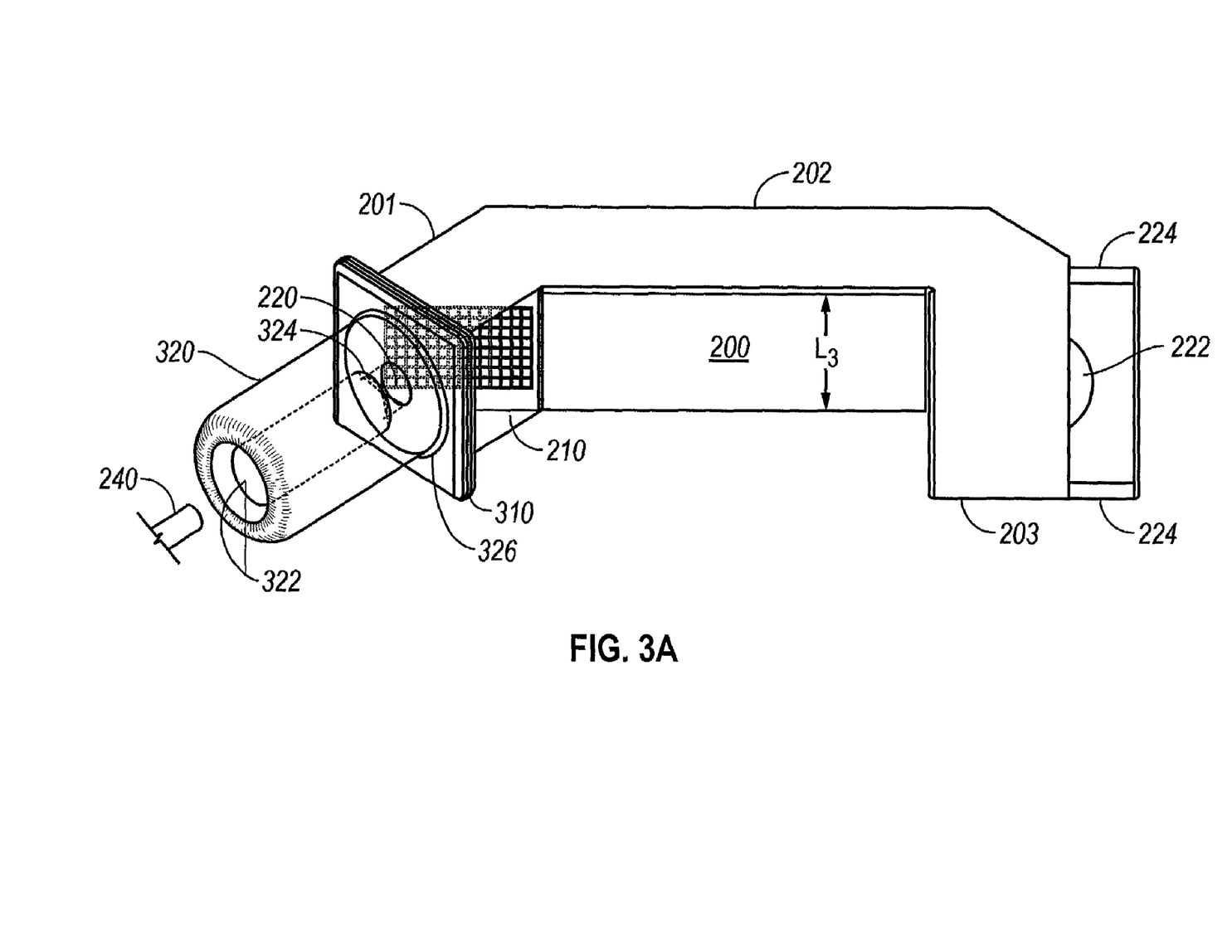
FIGS. 3A and 3B show three-dimensional drawing of a demultiplexer according to the present invention.

FIG. 3A shows a three-dimensional view of an embodiment of demultiplexer module 200 according to the present invention. Demultiplexer module 200 includes sections 201, 202 and 203, as discussed above. Further, a post 310 can be integrally formed with section 201. In some embodiments, barrel 320 is removably affixed to part 310 and operates as a guide and positioner for optical fiber 240. Barrel 320 can be positioned on support 326. Support 326 can be a ring which either protrudes or is formed as a trench with which barrel 320 mates. Barrel 320 can also be epoxied to part 310 on support 326 in order to provide better structural integrity to demultiplexer 250. In some embodiments, barrel 320 can be integrally formed with demultiplexer module 200 by injection molding. Barrel 320 includes fiber access 322 with fiber stop 324. In operation, when optical fiber 240 is inserted into fiber access 322 to fiber stop 324, optical fiber 240 is aligned with lens 220.

In some embodiments, fiber access 322 of barrel 320 has a depth of about 4 mm before encountering fiber stop 324. The end of inserted fiber 240, which is flush with fiber stop 324, can then be separated by a distance of about 1 mm from the vertex of lens 220. Fiber access 322 can have a diameter of about 2.5 mm in order to accept single mode, multi-mode, silica, or plastic optical fibers. In some embodiments, the outer diameter of barrel 320 can be about 4 mm. Barrel 320 can be integrally molded with demultiplexer module 200 or can be detachably coupled to post 310 which is integrally molded with demultiplexer module 200.

Figure 3B:
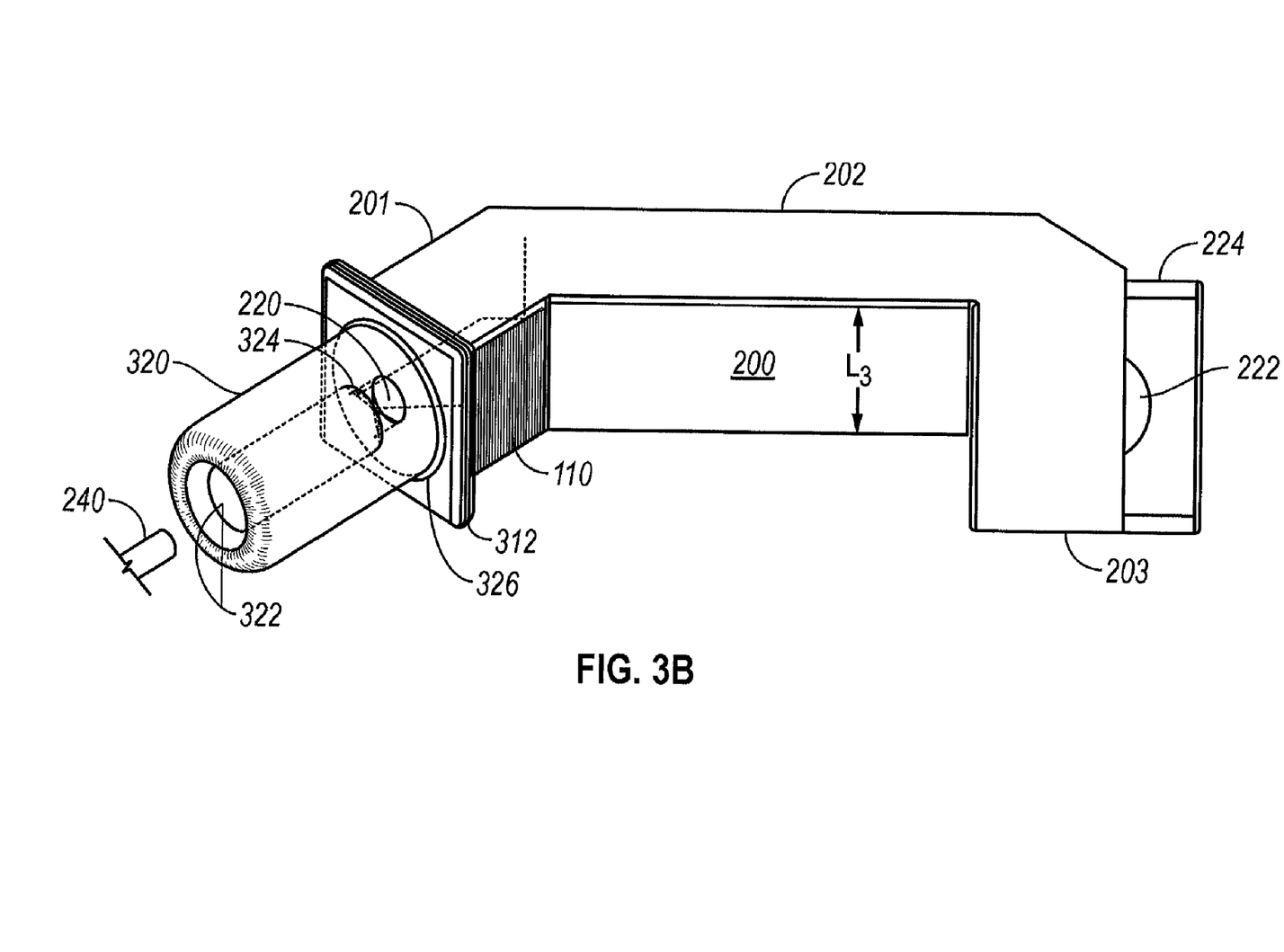

FIG. 3B shows a three-dimensional drawing of a demultiplexer module 200 according to the present invention where transmission grating 110 is shown rather than reflection surface 210, as is shown in FIG. 3A.

Figure 4:
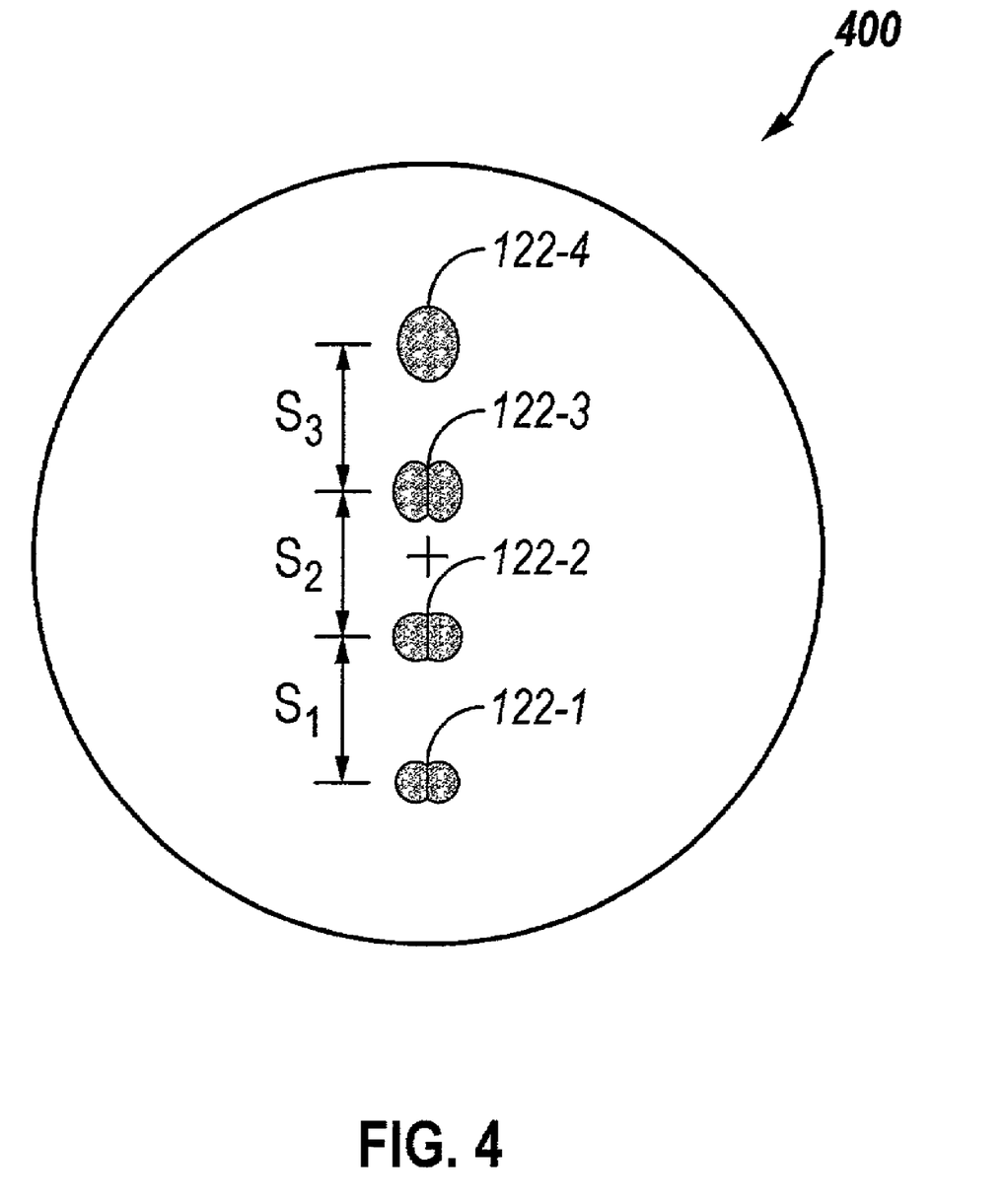
FIG. 4 shows a projection of spatially separated optical beams in a demultiplexer according to the present invention.

FIG. 4 shows a beam profile at detector array 125 of an N=4 embodiment of a demultiplexer 250 according to the present invention. Each of independent beams 122-1 through 122-4 of FIG. 4 is resultant from a particular embodiment of demultiplexer module 200 utilized with a WDM system having $\lambda_1=1275$ nm, $\lambda_2=1300$ nm, $\lambda_3=1325$ nm, and $\lambda_4=1350$ nm. From FIG. 2, demultiplexer module 200 has length $L_1=12$ mm, width $L_2=12.5$ mm, and thickness $L_3=6$ mm (see FIG. 3A). Furthermore, grating 110 is characterized as having 2000 lines/mm resulting in θ being about 45° ($\theta_1$ about 42°, $\theta_2$ about 44°, $\theta_3$ about 46°, $\theta_4$ about 48°). Lens 220 is characterized as having a radius of curvature equal to 500 µm and a conic constant equal to −2.5 and lens 222 is characterized as having a radius of curvature equal to 300 µm and a conic constant equal to −2.5. The surface of detector array 125 is positioned a distance d of about 500 µm from the base of lens 222 of section 203. Under those conditions, individual beams 122-1 through 122-4 are well resolved with separations between beams 122-1 and 122-2, between beams 122-2 and 122-3, and between beams 122-3 and 122-4 (separations $S_1$, $S_2$, and $S_3$, respectively) of about 250 µm.

The embodiments described above are exemplary only and are not intended to be limiting. One skilled in the art will recognize variations that are intended to be within the spirit and scope of this disclosure. As such, the invention is limited only by the following claims.

We claim:

1. A demultiplexer, comprising:
   a single molded piece comprising an integrated first section, second section, third section, and diffraction grating,
   the first section capable of receiving a WDM beam,
   the diffraction grating integrally formed on an external surface of the first section and an external surface of the single molded piece, the WDM beam being directed onto an internal surface of the diffraction grating, and the diffraction grating providing angularly separated beams on an external surface of the diffraction grating; and
   the third section positioned relative to the first section to receive spatially separated light beams of a selected diffraction order from the diffraction grating.

2. The demultiplexer of claim 1, further including
   a reflective surface integrally formed on the first section that directs the WDM beam received into the first section onto a bottom surface of the diffraction grating.

3. The demultiplexer of claim 2, wherein
   the reflective surface is coated external to the first section with thin film to enhance internal reflection of the WDM beam.

4. The demultiplexer of claim 2, wherein
   the reflective surface is coated with a reflective film.

5. The demultiplexer of claim 4, wherein
   the reflective film is a gold film.

6. The demultiplexer of claim 4, wherein
   the reflective film is a silver film.

7. The demultiplexer of claim 1, wherein
   the first section includes an integrally formed collimating lens integrally formed into the single piece,
   the integrally formed collimating lens collimating the WDM beam received from an optical fiber.

8. The demultiplexer of claim 7, further including
   a barrel integrally formed into the single piece with the first section,
   the barrel capable of receiving an optical fiber and aligning the optical fiber with the collimating lens.

9. The demultiplexer of claim 8, wherein
   the barrel includes a fiber access and a fiber stop.

10. The demultiplexer of claim 7, further including
a post integrally formed into the single piece with the first section,
the post capable of receiving a barrel,
the barrel capable of receiving an optical fiber and aligning the optical fiber with the collimating lens.

11. The demultiplexer of claim 10, wherein
the barrel includes a fiber access and a fiber stop.

12. The demultiplexer of claim 1, wherein
the third section includes a focusing lens.

13. The demultiplexer of claim 12, wherein
the third section further includes a support around the focusing lens.

14. The demultiplexer of claim 13, wherein
a detector array can be mounted on the support so that the spatially separated beams are directed onto individual detectors of the detector array.

15. The demultiplexer of claim 13, wherein
optical fibers are arranged to receive individual ones of the spatially separated beams.

16. A demultiplexer, comprising:
means for separating an input light beam into constituent parts having a diffraction means;
means for detecting the constituent parts from the means for separating;
means for aligning the means for separating with the means for detecting, wherein the means for separating, the means for detecting, and the means for aligning are integrated as a molded single piece component, and the diffraction means is on an external surface of the means for separating and an external surface of the molded single piece component.

* * * * *